United States Patent
Joshi et al.

(10) Patent No.: US 7,095,741 B1
(45) Date of Patent: Aug. 22, 2006

(54) PORT ISOLATION FOR RESTRICTING TRAFFIC FLOW ON LAYER 2 SWITCHES

(75) Inventors: Monica Joshi, San Jose, CA (US);
Pauline Shuen, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 667 days.

(21) Appl. No.: 09/745,280

(22) Filed: Dec. 20, 2000

(51) Int. Cl.
  *H04L 12/28* (2006.01)
  *H04L 9/00* (2006.01)

(52) U.S. Cl. .................. 370/392; 370/420; 713/154

(58) Field of Classification Search .......... 370/254, 370/351, 359, 380, 381, 386, 389, 390, 392, 370/398, 399, 401, 402, 395.3–395.32, 395.53, 370/442, 427, 432, 420; 713/151, 153, 154, 713/162, 200, 201; 340/825
See application file for complete search history.

(56) References Cited

U.S. PATENT DOCUMENTS

| | | | |
|---|---|---|---|
| 4,446,555 A | 5/1984 | Devault et al. | 370/94 |
| 4,456,957 A | 6/1984 | Schieltz | 364/200 |
| 4,506,358 A | 3/1985 | Montgomery | 370/60 |
| 4,646,287 A | 2/1987 | Larson et al. | 370/60 |
| 4,769,810 A | 9/1988 | Eckberg, Jr. et al. | 370/60 |
| 4,769,811 A | 9/1988 | Eckberg, Jr. et al. | 370/60 |
| 4,893,306 A | 1/1990 | Chao et al. | 370/94.2 |
| 4,922,486 A * | 5/1990 | Lidinsky et al. | 370/427 |
| 4,962,497 A | 10/1990 | Ferenc et al. | 370/60.1 |
| 5,088,032 A | 2/1992 | Bosack | 395/200 |
| 5,095,480 A * | 3/1992 | Fenner | 370/238 |
| 5,136,580 A | 8/1992 | Videlock et al. | 370/60 |
| 5,202,899 A | 4/1993 | Walsh | 375/8 |
| 5,212,686 A | 5/1993 | Joy et al. | 370/60 |
| 5,237,564 A | 8/1993 | Lespagnol et al. | 370/60.1 |
| 5,241,682 A | 8/1993 | Bryant et al. | 395/800 |

(Continued)

FOREIGN PATENT DOCUMENTS

WO    WO 95/20850    8/1995

(Continued)

OTHER PUBLICATIONS

Awduche, et al., "Requirements for Traffic Engineering Over MPLS".

(Continued)

*Primary Examiner*—Hassan Kizou
*Assistant Examiner*—Gregory Sefcheck
(74) *Attorney, Agent, or Firm*—Thelen Reid & Priest LLP; David B. Ritchie

(57) ABSTRACT

This invention provides for an apparatus and method to isolate ports on layer 2 switches on the same VLAN to restrict traffic flow. The apparatus comprises a switch having said plurality of ports, each port configured as a protected port or a non-protected port. An address table memory stores an address table having a destination address and port number pair. A forwarding map generator generates a forwarding map which is responsive to a destination address of a data packet. The method for isolating ports on a layer 2 switch comprises configuring each of the ports on the layer 2 switch as a protected port or a non-protected port. A destination address on an data packet is matched with a physical address on said layer 2 switch and a forwarding map is generated for the data packet based upon the destination address on the data packet. The data packet is then sent to the plurality of ports pursuant to the forwarding map generated based upon whether the ingress port was configured as a protected or nonprotected port.

25 Claims, 2 Drawing Sheets

U.S. PATENT DOCUMENTS

| | | | |
|---|---|---|---|
| 5,249,178 A | 9/1993 | Kurano et al. | 370/60 |
| 5,253,251 A | 10/1993 | Aramaki | 370/60 |
| 5,274,631 A | 12/1993 | Bhardwaj | 370/60 |
| 5,274,643 A | 12/1993 | Fisk | 370/94.1 |
| 5,280,480 A | 1/1994 | Pitt et al. | 370/85.13 |
| 5,291,482 A | 3/1994 | McHarg et al. | 370/60 |
| 5,303,237 A | 4/1994 | Bergman et al. | 370/85.6 |
| 5,305,311 A | 4/1994 | Lyles | 370/60 |
| 5,307,343 A | 4/1994 | Bostica et al. | 370/60 |
| 5,311,509 A | 5/1994 | Heddes et al. | 370/60 |
| 5,339,311 A | 8/1994 | Turner | 370/60 |
| 5,345,445 A | 9/1994 | Hiller et al. | 370/60.1 |
| 5,345,446 A | 9/1994 | Hiller et al. | 370/60.1 |
| 5,359,593 A | 10/1994 | Corbalis et al. | 370/17 |
| 5,365,524 A | 11/1994 | Hiller et al. | 370/94.2 |
| 5,367,517 A | 11/1994 | Cidon et al. | 370/54 |
| 5,394,402 A * | 2/1995 | Ross | 370/402 |
| 5,408,469 A | 4/1995 | Opher et al. | 370/60.1 |
| 5,414,705 A | 5/1995 | Therasse et al. | 370/60.1 |
| 5,422,882 A | 6/1995 | Hiller et al. | 370/60.1 |
| 5,426,636 A | 6/1995 | Hiller | 370/60.1 |
| 5,428,607 A | 6/1995 | Hiller et al. | 370/60.1 |
| 5,452,297 A | 9/1995 | Hiller et al. | 370/60.1 |
| 5,497,371 A | 3/1996 | Ellis et al. | 370/60 |
| 5,530,963 A | 6/1996 | Moore et al. | 395/200.15 |
| 5,559,883 A * | 9/1996 | Williams | 713/201 |
| 5,583,862 A | 12/1996 | Callon | 370/397 |
| 5,617,421 A | 4/1997 | Chin et al. | 370/402 |
| 5,634,074 A | 5/1997 | Devon et al. | 395/828 |
| 5,648,970 A | 7/1997 | Kapoor | 370/394 |
| 5,666,292 A * | 9/1997 | Hunter et al. | 710/62 |
| 5,696,993 A | 12/1997 | Gavish | 395/882 |
| 5,712,854 A | 1/1998 | Dieudonne et al. | 370/536 |
| 5,734,654 A | 3/1998 | Shirai et al. | 370/396 |
| 5,742,604 A | 4/1998 | Edsall et al. | 370/401 |
| 5,751,710 A | 5/1998 | Crowther et al. | 370/423 |
| 5,764,636 A * | 6/1998 | Edsall | 370/401 |
| 5,764,736 A | 6/1998 | Shachar et al. | 379/93.09 |
| 5,764,756 A | 6/1998 | Onweller | 379/242 |
| 5,793,978 A | 8/1998 | Fowler | 395/200.56 |
| 5,802,047 A | 9/1998 | Kinoshita | 370/359 |
| 5,844,979 A | 12/1998 | Raniere et al. | 379/202 |
| 5,845,068 A * | 12/1998 | Winiger | 713/200 |
| 5,878,231 A * | 3/1999 | Baehr et al. | 709/245 |
| 5,884,025 A * | 3/1999 | Baehr et al. | 713/201 |
| 5,959,990 A | 9/1999 | Frantz et al. | 370/392 |
| 5,969,632 A * | 10/1999 | Diamant et al. | 340/5.3 |
| 6,144,638 A * | 11/2000 | Obenhuber et al. | 370/231 |
| 6,308,218 B1 * | 10/2001 | Vasa | 709/238 |
| 6,473,406 B1 * | 10/2002 | Coile et al. | 370/248 |
| 6,505,192 B1 * | 1/2003 | Godwin et al. | 707/3 |
| 6,587,469 B1 * | 7/2003 | Bragg | 370/401 |
| 6,647,428 B1 * | 11/2003 | Bannai et al. | 709/245 |
| 2002/0110425 A1 * | 8/2002 | Banks et al. | 370/392 |

FOREIGN PATENT DOCUMENTS

WO    WO 98/11704    3/1998

OTHER PUBLICATIONS

Cisco, L2TP.
Cicso, "LAN Switching".
Cisco, "Layer 2 Tunnel Protocol".
McKeown et al., "The Bay Bridge: A High Speed Bridge/Router".
"MultiVPN from Ascend Communications: Breaking Down the Barriers to VPNs", Ascend.
Pel et al., "Putting Routing Tables in Silicon".
Rosen et al., "Multiprotocol Label Switching Architecture".
Valencia et al. "Layer Two TUNNELING Protocol L2TP".
Zhang, et al., "Rate-Controlled Static-Priority Queueing".

* cited by examiner

PORT ISOLATION FOR RESTRICTING TRAFFIC FLOW ON LAYER 2 SWITCHES

FIELD OF THE INVENTION

The present invention relates to layer 2 switches. More particularly, the present invention relates to a method an apparatus to isolate ports on layer 2 switches to restrict traffic flow.

BACKGROUND OF THE INVENTION

Modern computer networks are divided up into layers. Each layer is responsible for providing some service to the layer above it, and may use the services of the layer below it. The International Standards Organization ("ISO") defined seven layers as a standard for computer networks. The layers are defined as follows:

1. A physical layer, which is responsible for transmitting unstructured bits of information across a link;

2. A data link layer, which transmits chunks of information across a link. It handles error notification, network topology, and flow control. Ethernet, Token Ring, and FDDI are media access methods that offer the functionality defined by the data link layer;

3. A network layer, which is responsible for ensuring that any pair of systems in the network can communicate with each other;

4. A transport layer, which establishes a reliable communications stream between a pair of systems;

5. A session layer, which offers services above the simple full-duplex reliable communication stream provided by the transport layer;

6. A presentation layer, which is responsible for providing a means by which applications can agree on representations of data; and 7. An application layer, which runs applications.

This invention relates only to layer 2, the data link layer or the MAC layer. Layer 2 is the communication protocol which contains the physical address of a client or server station which is inspected by a bridge or switch. The layer 2 switch then forwards traffic based on the MAC layer (Ethernet or Token Ring) addresses. Currently, traffic flows such as such as broadcast, unknown multicast, or unknown unicast received at the switch are not isolated between ports on the switch so that every user on the same virtual local area network (VLAN) is able to see the traffic generated by another user on the same VLAN. There are currently many users, such as multi-dwelling unit or multi-tenant unit users which obtain network connectivity through layer 2 switches, which have confidentiality and security concerns and would like to prevent others from seeing their traffic.

Currently, one way to achieve complete isolation between access ports at layer 2 is to assign each user port an individual VLAN. The disadvantage of this approach is that the number of VLANs can grow considerably large as the number of user ports increase. This is also not a practical solution where a large number of switches are connected to each other as well as providing connections to home users, thereby increasing the number of VLANs dramatically. Thus, there exists a need for access port isolation that is more efficient and would allow port isolation at a layer 2 switch that belongs to the same VLAN.

SUMMARY OF THE INVENTION

This invention provides for an apparatus and method to isolate ports on layer 2 switches on the same VLAN to restrict traffic flow. The apparatus comprises a switch having said plurality of ports, each port configured as a protected port or a non-protected port. An address table memory stores an address table having a destination address and port number pair. A forwarding map generator generates a forwarding map which is responsive to a destination address of an incoming packet.

The method for isolating ports on a layer 2 switch comprises configuring each of the ports on the layer 2 switch as a protected port or a non-protected port. A destination address on an data packet is matched with a physical address on said layer 2 switch and a forwarding map is generated for the data packet based upon the destination address on the data packet. The data packet is then sent to the plurality of ports pursuant to the forwarding map generated based upon whether the ingress port was configured as a protected or nonprotected port.

BRIEF DESCRIPTION OF THE DRAWINGS

The accompanying drawings, which are incorporated in and constitute a part of this Specification, illustrate one or more embodiments of the invention and, together with the present description, serve to explain the principles of the invention.

In the drawings.

DETAILED DESCRIPTION OF A PREFERRED EMBODIMENT

An embodiment of the present invention is described herein in the context of layer 2 switches. Those of ordinary skill in the art will realize that the following description of the present invention is illustrative only and not in any way limiting. Other embodiments of the invention will readily suggest themselves to such skilled persons having the benefit of this disclosure. Reference will now be made in detail to implementations of the present invention as illustrated in the accompanying drawings. The same reference numbers will be used throughout the drawings and the following description to refer to the same or like parts.

In the interest of clarity, not all the routine features of the implementations described herein are described. It will of course be appreciated that in the development of any such actual implementation, numerous implementation-specific decisions must be made to achieve a developer's specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Ethernet is the most widely-used local area network ("LAN") and is normally a shared media LAN. All stations on the segment share the total bandwidth, which is currently either 10 Mbps, 100 Mbps, or 1000 Mbps. With the increase in security concerns, the multiple traffic flows received at a switch need to be isolated within each port on layer 2 switches 12. The traffic may be broadcast traffic, where the data packet(s) 10 is transmitted to everyone on the network, unknown or known unicast, where the data packet(s) 10 is transmitted from one station to another such as from a client to a server or from a server to another server, or multicast, where the data packet(s) 10 is transmitted to a predetermined list of recipients.

Figure 1:
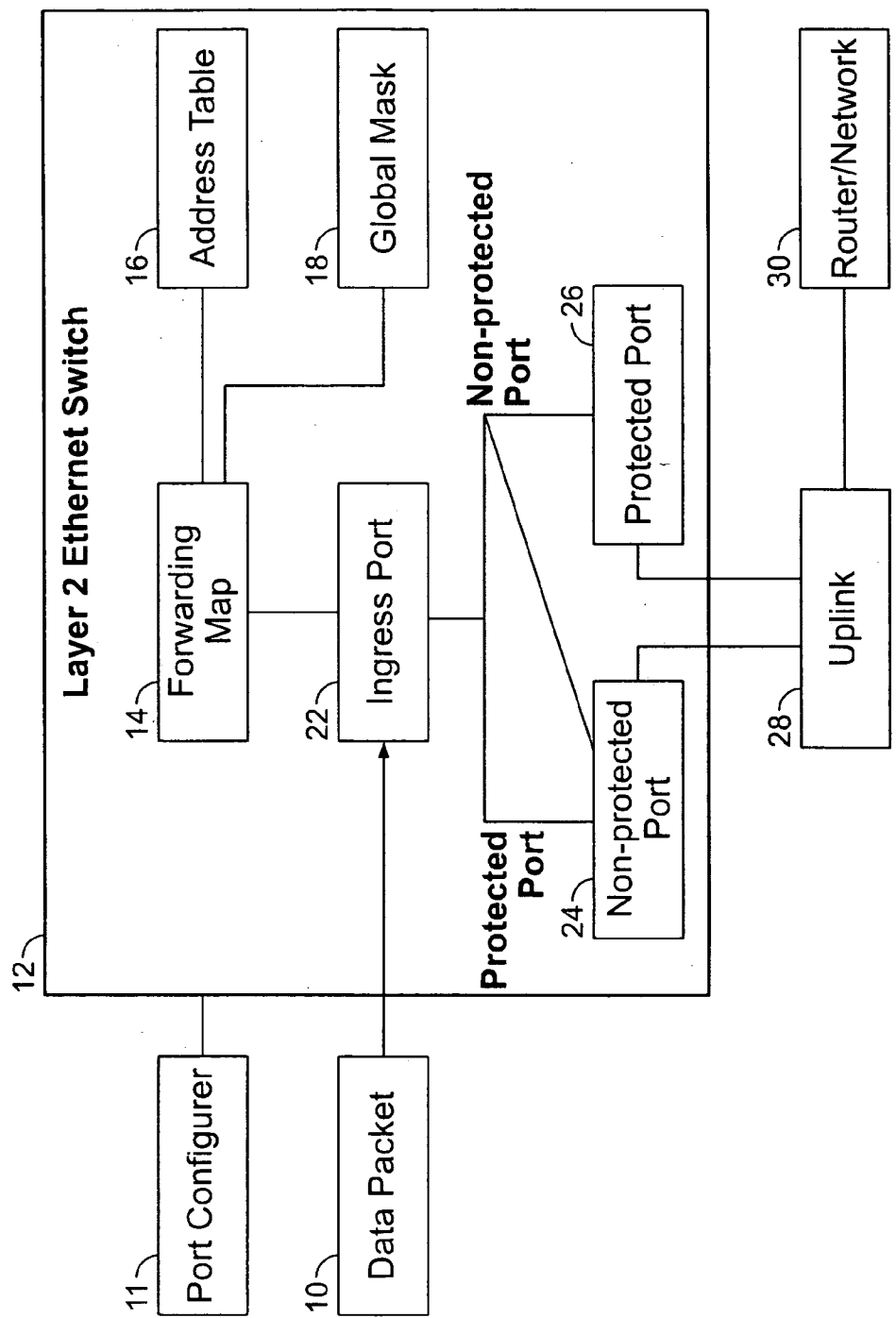
FIG. 1 is a diagram of a specific embodiment of the present invention.

Referring to FIG. 1, ports on a layer 2 switch 12 may be isolated by a user by using a port configurer 11, such as a Command Line Interface (CLI) to configure a port as a protected port or a non-protected port. The ports may be configured from a port configurer 11 through programming or network management. Once a data packet 10 is received by the layer 2 switch 12, a forwarding map generator 14 generates a forwarding map to direct the data packet 10 to its respective ports, however, the global mask 18 on the layer 2 switch 12 may edit the forwarding feature of the data packet 10 depending on whether the ingress or source port 22 is a protected port or non-protected port. The global mask 18 acts as an editor to change the forwarding features of the data packet 10 by modifying/changing the port numbers on the forwarding map. If the ingress port 22 is configured to be a protected port, the data packet 10 received by that port will not be forwarded to any other protected ports 26 on the switch, but may be forwarded to other non-protected ports 24. Thus, the global mask 18 will modify the forwarding map so that the data packet will not be forwarded to ports configured as protected ports 26. If, on the other hand, the ingress port 22 is a non-protected port, the data packet 10 received by that port can be forwarded to all other ports whether configured as protected 26 or non-protected 24. Once the data packet 10 is sent to all ports as directed by the forwarding map 14, it may then be directed to an uplink 28 and onto a router or a network 30. However, those skilled in the art will realize that the uplink 28 and router/network 30 are not necessary to carry out the present invention.

The forwarding map is generated by a forwarding map generator 14. The forwarding map generator 14 looks to an address table 16, which has a list of destination addresses matched with a port number, to match the destination address on the data packet 10 with a port number. Whether or not a match is found, if the ingress port 22 is a non-protected port 22, the forwarding map 14 will direct the data packet 10 to all other ports on the switch 12 whether it is a non-protected 24 or protected port 26. However, if the ingress port 22 is a protected port, the global mask 18 will adjust the forwarding map 14 so that only non-protected ports 24 may receive the data packet 10 and not other protected ports 26.

Figure 2:
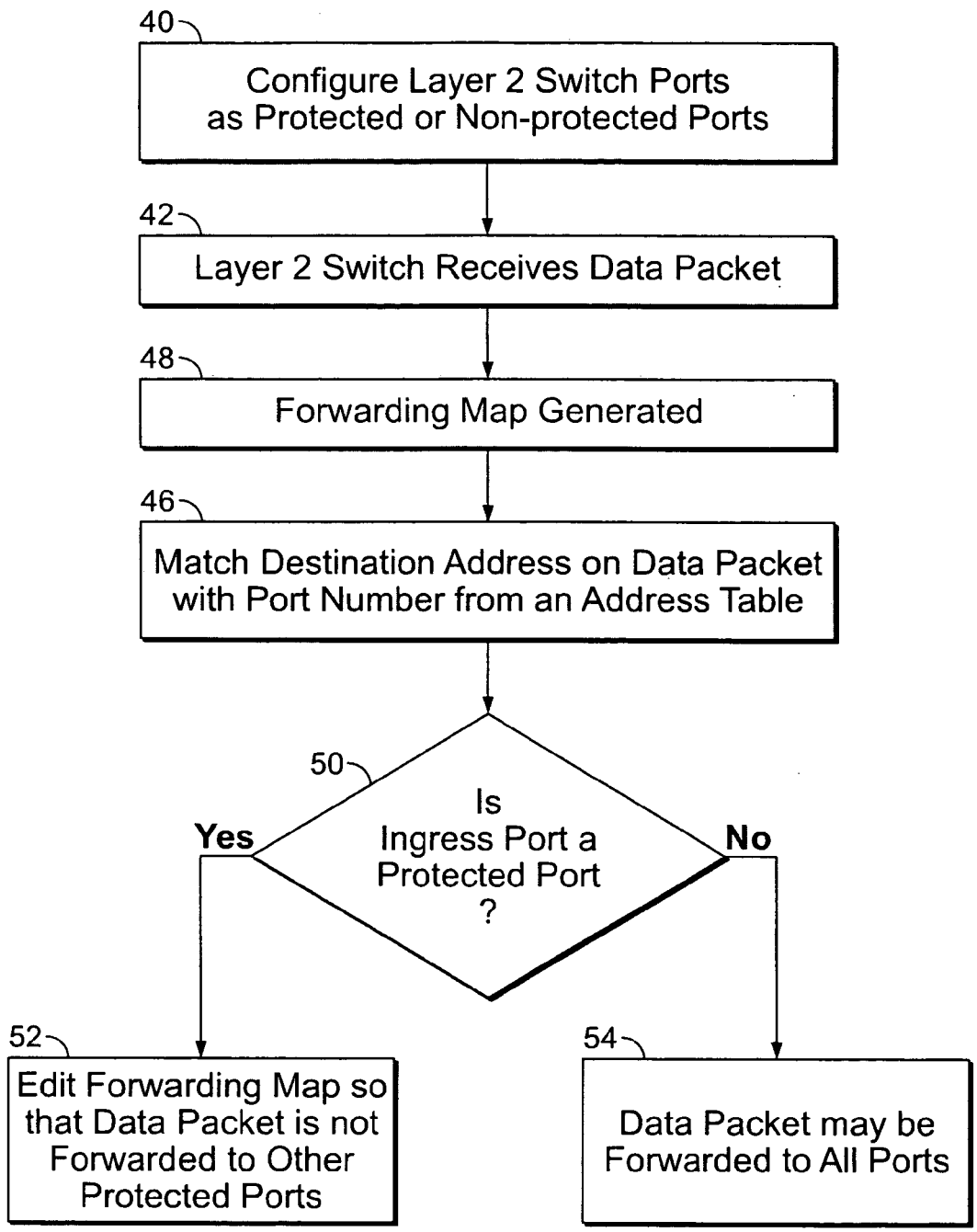
FIG. 2 is a flow chart showing a specific embodiment of the present invention.

Now referring to FIG. 2, the present invention also provides for a method for isolating ports on a layer 2 switch. The ports are configured as protected or non-protected ports by a user 40. A data packet is received by a layer 2 switch 42 which generates a forwarding map for the data packet 48. The destination address on the data packet is matched with a physical address or port number on the layer 2 switch by looking to an address table 46. Whether or not a match is found, if the ingress port is a protected port 50, the global mask will edit the forwarding map so that the data packet is sent to all other non-protected ports only and not any of the other protected ports 52. However, if the ingress port is a non-protected port 50, then all ports, whether non-protected or protected may receive the data packet 54. Once the data packet is sent to all necessary ports as directed by the forwarding map, the data packet may be sent to an uplink and onto a router or network. However, those skilled in the art will realize that the uplink and router/network are not necessary to carry out the present invention.

While embodiments, examples, and applications of this invention are shown and described, it would be apparent to those of ordinary skill in the art having the benefit of this disclosure that many more modifications than mentioned above are possible without departing from the inventive concepts herein. Thus, what has been disclosed is merely illustrative of the present invention and other arrangements or methods can be implemented by those skilled in the art without departing from the spirit and scope of the present invention.

What is claimed is:

1. A method for isolating a plurality of ports sharing a single virtual local area network (VLAN) on a layer 2 switch, wherein the single VLAN is a group of devices within a local area network, at least one device in the group not belonging to any other VLAN, the method comprising:

configuring each of said plurality of ports by a user on said layer 2 switch as a protected port or a non-protected port;

matching a destination address on a data packet with a physical address on said layer 2 switch, said data packet received by an ingress port;

generating a forwarding map for said data packet based upon said destination address on said data packet, wherein the generating further includes allowing said data packet to be forwarded from a protected port to a non-protected port while preventing said data packet from being forwarded to another of said protected ports; and sending said data packet to said plurality of ports pursuant to said forwarding map.

2. The method of claim 1 wherein said generating step further comprises sending said data packet to each of said non-protected ports if said destination address is not matched with said physical address and said ingress port is a protected port.

3. The method of claim 1 wherein said generating step further comprises sending said data packet to all of said plurality of ports if said destination address is not matched with said physical address and said ingress port is a non-protected port.

4. The method of claim, 1 wherein said generating step further comprises allowing said data packet to be forwarded from one of said non-protected ports to another of said non-protected ports.

5. A program storage device readable by a machine, tangibly embodying a program of instructions executable by the machine to perform a method for isolating a plurality of ports sharing a single virtual local area network (VLAN) on a layer 2 switch, wherein the single VLAN is a group of devices within a local area network, at least one device in the group not belonging to any other VLAN, said method comprising:

configuring each of said plurality of ports by a user on said layer 2 switch as a protected port or a non-protected port;

matching a destination address on a data packet with a physical address on said layer 2 switch, said data packet received by an ingress port;

generating a forwarding map for said data packet based upon said destination address on said data packet, wherein the generating further includes allowing said packet to be forwarded to another of said protected ports; and sending said data packet to said plurality of ports pursuant to said forwarding map.

6. An apparatus for isolating a plurality of ports sharing a single virtual local area network (VLAN) on a layer 2 switch, wherein the single VLAN is a group of devices within a local area network, at least one device in the group not belonging to any other VLAN, the apparatus comprising:

a port configurer to configure said plurality of ports as a protected port or a non-protected port;

an address table memory storing an address table, said address table having a destination address and port number pair;

a forwarding map generator generating a forwarding map; and said forwarding map responsive to a destination address of a data packet so that the data packet is forwarded either to a port number paired with the destination address in said forwarding table, or if not so paired, said data packet is forwarded to each of said non-protected ports on said switch and said data packet is prevented from forwarded to a protected port if an ingress port is protected or if said ingress port is non-protected, said data packet is forwarded to all of said plurality of ports.

7. The apparatus of claim 6 wherein said incoming packet is forwarded from one of said non-protected ports to other non-protected ports.

8. An apparatus for isolating a plurality of ports sharing a single virtual local area network (VLAN) on a layer 2 switch, wherein the single VLAN is a group of devices within a local area network, at least one device in the group not belonging to any other VLAN, the apparatus comprising:

means to configure each of said plurality of ports on said layer 2 switch as a protected or non-protected port;

means to match a destination address on a data packet with a physical address on said layer 2 switch, said data packet received on an ingress port;

means to generate a forwarding map for said data packet based upon said destination address on said data packet, wherein the generating further includes allowing said data packet to be forwarded from a protected port to a non-protected port while preventing said data packet from being forwarded to another of said protected ports; and means to send said data packet to said plurality of ports pursuant to said forwarding map.

9. The apparatus of claim 8 wherein said means to generate a forwarding map further comprises a means to forward said data packet to each of said non-protected ports if said destination address is not matched with said physical address and said ingress port is a protected port.

10. The apparatus of claim 8 wherein said means to generate a forwarding map further comprises a means to forward said data packet to all of said plurality of ports if said destination address is not matched with said physical address and said ingress port is a non-protected port.

11. The apparatus of claim 8 wherein said means to generate a forwarding map further comprises means to allow said data packet to be forwarded from one of said non-protected ports to another of said non-protected ports.

12. A method for isolating a plurality of ports sharing a single virtual local area network (VLAN) on a layer 2 switch, wherein the single VLAN is a group of devices within a local area network, at least one device in the group not belonging to any other VLAN, the method comprising:

maintaining a state for each of said plurality of ports on said layer 2 switch as a protected port or a non-protected port;

matching a destination address on a data packet with a physical address on said layer 2 switch, said data packet received by an ingress port;

generating a forwarding map for said data packet based upon said destination address on said data packet, wherein the generating further includes allowing said data packet to be forwarded from a protected port to a non-protected port while preventing said data packet from being forwarded to another of said protected ports; and sending said data packet to said plurality of ports pursuant to said forwarding map.

13. The method of claim 12 wherein said generating step further comprises sending said data packet to each of said non-protected ports if said destination address is not matched with said physical address and said ingress port is a protected port.

14. The method of claim 12 wherein said generating step further comprises sending said data packet to all of said plurality of ports if said destination address is not matched with said physical address and said ingress port is a non-protected port.

15. The method of claim 12 wherein said generating step further comprises allowing said data packet to be forwarded from one of said non-protected ports to another of said non-protected ports.

16. The method of claim 12 wherein said generating step further comprises allowing said data packet to be forwarded between one of said non-protected ports to each of said protected ports.

17. A program storage device readable by a machine, tangibly embodying a program of instructions executable by the machine to perform a method for isolating a plurality of ports sharing a single virtual local area network (VLAN) on a layer 2 switch, wherein the single VLAN is a group of devices within a local area network, at least one device in the group not belonging to any other VLAN, said method comprising:

maintaining a state for each of said plurality of ports on said layer 2 switch as a protected port or a non-protected port;

matching a destination address on a data packet with a physical address on said layer 2 switch, said data packet received by an ingress port;

generating a forwarding map for said data packet based upon said destination address on said data packet, wherein the generating further includes allowing said data packet to be forwarded from a protected port to a non-protected port while preventing said data packet from being forwarded to another of said protected ports; and sending said data packet to said plurality of ports pursuant to said forwarding map.

18. An apparatus for isolating a plurality of ports sharing a single virtual local area network (VLAN) on a layer 2 switch, wherein the single VLAN is a group of devices within a local area network, at least one device in the group not belonging to any other VLAN, the method comprising:

means for maintaining a state for each of said plurality of ports on said layer 2 switch as a protected port or a non-protected port;

means for matching a destination address on a data packet with a physical address on said layer 2 switch, said data packet received by an ingress port;

means for generating a forwarding map for said data packet based upon said destination address on said data packet, wherein the generating further includes allowing said data packet to from being forwarded to another of said protected ports; and means for sending said data packet to said plurality of ports pursuant to said forwarding map.

19. The apparatus of claim 18 wherein said means for generating further comprises means for sending said data packet to each of said non-protected ports if said destination address is not matched with said physical address and said ingress port is a protected port.

20. The apparatus of claim 18 wherein said means for generating further comprises means for sending said data packet to all of said plurality of ports if said destination address is not matched with said physical address and said ingress port is a non-protected port.

21. The apparatus of claim 18 wherein said means for generating further comprises means for allowing said data packet to be forwarded from one of said non-protected ports to another of said non-protected ports.

22. An apparatus for isolating a plurality of ports sharing a single virtual local area network (VLAN) on a layer 2 switch, wherein the single VLAN is a group of devices within a local area network, at least one device in the group not belonging to any other VLAN, the apparatus comprising:

a state maintenance module configured to maintain a state for each of said plurality of ports on said layer 2 switch as a protected port or a non-protected port;

a destination address matching module coupled to said state maintenance module and configured to match a destination address on a data packet with a physical address on said layer 2 switch, said data packet received by an ingress port;

a forwarding map generator coupled to said destination address matching module; and a data packet sending module coupled to said forwarding map generator and configured to send said data packet to said plurality of ports pursuant to said forwarding map while preventing said data packet from being forwarded from an ingress protected port to another of said protected ports.

23. The apparatus of claim 22 wherein said forwarding map generator is configured to send said data packet to each of said non-protected ports if said destination address is not matched with said physical address and said ingress port is a protected port.

24. The apparatus of claim 22 wherein said forwarding map generator is configured to send said data packet to all of said plurality of ports if said destination address is not matched with said physical address and said ingress port is a non-protected port.

25. The apparatus of claim 22 wherein said forwarding map generator is further configured to allow said data packet to be forwarded from one of said non-protected ports to another of said non-protected ports.

* * * * *